UNITED STATES PATENT OFFICE.

SAMPOW KIMATA, OF KOBE, JAPAN.

PROCESS FOR MANUFACTURING TENNIS-GUT.

1,231,911. Specification of Letters Patent. Patented July 3, 1917.

No Drawing. Application filed June 10, 1916. Serial No. 103,033.

*To all whom it may concern:*

Be it known that I, SAMPOW KIMATA, a subject of the Emperor of Japan, residing at No. 296, 7 Chome, Shimo-Yamate-Dori, city of Kobe, Empire of Japan, have invented an Improved Process for Manufacturing Tennis-Gut, of which the following is a specification.

This invention has reference to an improved process of manufacturing catgut strings for tennis rackets according to which the string or cord prepared by twisting together a plurality of fibers obtained by splitting or pounding the sinews or tendons of certain animals is essentially bleached and degreased by saturating the said cord with a solution in which the same is subjected to oxidizing and saponifying action so as to give it a substantial glue absorbing character, and subsequently impregnating it in a perfectly bleached viscoidal liquid, and the invention has for its object to produce a white, transparent tennis gut with its fibers permanently united.

In carrying my invention into practice, I employ as a base, sinews or tendons obtained from the body of a certain animal as for instance a whale or the like, or tendons of domestic animals such as cow or bull, or the like animals.

The base obtained is in the first place carefully split or reduced into a number of fine fibers, preferably by way of pounding, and twisted together so as to form a string or cord of suitable size and length, which is then impregnated with a solution consisting of 10% of sodium peroxid and 30% of magnesium sulfate so that the same will be subjected to the oxidizing and saponifying action thereof.

Upon treating the base in the said mixture, a reaction indicated by the following equation takes place:

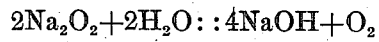

As the result of this reaction, the caustic soda, by saponification, tends to free all the fatty matters contained in the base, while the oxygen, in the form of nascent oxygen, acts to bleach the same. By leaving the base, therefore, soaked in such mixture or solution for a period of, say, two or three days, it is possible not only to bleach the base but also to degrease the same in order to obtain a most perfect and successful result.

Besides the mixture above mentioned, I prepare separately another mixture or solution consisting of 20% of sodium peroxid and 60% of magnesium sulfate.

To this mixture, a suitable quantity of certain gum material such as for instance deer skin glue is added and kept saturated for about five days. I then proceed to treat this gum material further by immersing it into dilute sulfuric acid, diluted preferably 60 times, and the reaction indicated by the following equation takes place, due to the action of the sodium peroxid.

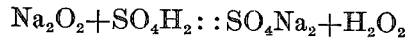

As the result of this reaction and in view of the hydrogen peroxid generated from which nascent oxygen is easily decomposed, the said gum material is thoroughly bleached, and, after thorough washing is boiled in a suitable vessel, preferably double bottomed, so as to produce a clean, transparent viscoidal liquid.

The viscoidal liquid thus obtained is then diluted with approximately 20% of water and filtered preferably through a fine textured cotton.

The base which has been previously bleached and degreased in the manner set forth is then dipped two or three times into the said viscoidal liquid just prepared, and subsequently stretched between the drying poles provided for the purpose beforehand.

The base, when dried to moderate extent, will then be coated several times with a thin layer of liquid glue and finished after the smoothing and polishing operations have been accomplished in the usual manner.

Prior to the treatment, the gum material above referred to may, if desired, be immersed in the alkaline liquid. Also, for the bleaching and degreasing purpose, the solution may consist of, if desired, a mixture of barium peroxid and hydrochloric acid, or sulfuric acid, with further addition of sodium silicate or ammonium carbonate.

What I claim is:—

The hereindescribed method of making catgut strings for tennis rackets, consisting in twisting animal tendons into a string or cord, degreasing and bleaching said cord and impregnating the same with a mixture of sodium peroxid and magnesium sulfate, and finally dipping the so prepared cord into a mixture of gum treated in diluted sulfuric acid, and drying the cord.

In testimony whereof I affix my signature in presence of two witnesses.

SAMPOW KIMATA.

Witnesses:
 W. EBIHARSH,
 ISAMA SAKAI.